United States Patent Office 3,080,360
Patented Mar. 5, 1963

3,080,360
17α-ALKYL-17β-HYDROXY-18-NORANDROST-4-EN-3-ONES
Raphael Pappo, Skokie, Ill., assignor to G. D. Searle & Co., Chicago, Ill., a corporation of Delaware
No Drawing. Filed July 11, 1960, Ser. No. 41,734
15 Claims. (Cl. 260—239.55)

The present invention is concerned with novel steroids of the androstane series which lack the characteristic $C_{13}$-methyl group and with novel intermediates in their manufacture. More particularly, these $C_{13}$-desmethyl steroids are 17α-alkyl-17β-hydroxy-18-norandrost-4-en-3-ones, as represented by the structural formula

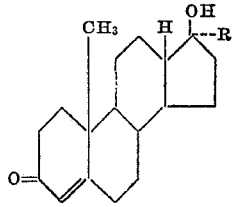

wherein R is a lower alkyl radical.

The matter compounds are useful as a result of their valuable pharmacological properties as evidenced, especially, by their potent anabolic and desoxycorticosterone acetate-inhibitory activities without their exhibiting at the same time the potent side-effects characeristic of related prior art compositions.

The lower alkyls represented by R in the structural formula supra are exemplified by methyl, ethyl, propyl, butyl, pentyl, hexyl, and the branched-chain isomers thereof.

Starting materials suitable for the manufacture of the instant 17α-alkyl-17β-hydroxy compounds are the 18-norandrost-4-ene-3,17-diones represented by the structural formula

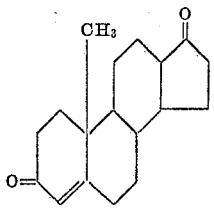

These novel intermediates are useful also as a result of their valuable pharmacological properties. In particular, they are potent anabolic, androgenic, desoxycorticosterone acetate-inhibitory, and anti-estrogenic agents, without displaying the potent side-effects typical of related prior art compositions. Suitably, the above-represented 13α-18-norandrost-14-ene-3,17-dione in dioxane is treated with ethyl orthoformate and ethanol in the presence of p-toluenesulfonic acid to afford the corresponding enol ether, 3-ethoxy-13α-18-norandrosta-3,5-dien-17-one. Reduction of the 17-oxo group, typically with an isopropyl alcohol solution containing sodium hydroxide and sodium borohydride, results in 3-ethoxy-18-norandrosta-3,5-dien-17β-ol. Oxidation of this 17β-ol, for example with chromium trioxide in pyridine, affords 3-ethoxy-18-norandrosta-3,5-dien-17-one, which is allowed to react with the appropriate alkyl Grignard reagent to introduce the 17α-alkyl-17β-hydroxy moiety. For instance, treatment of that 17-one in ether with ethereal methyl magnesium bromide results in 3-ethoxy-17α-methyl-18-norandrosta-3,5-dien-17β-ol. The desired 3-ones are obtained by acid hydrolysis of the enol ethers, as is shown by the reaction of 3-ethoxy-17α-methyl-18-norandrosta-3,5-dien-17β-ol in acetone with dilute hydrochloric acid to yield the instant 17β-hydroxy-17α-methyl-18-norandrost-4-en-3-one.

The aforementioned intermediate 18-norandrost-4-ene-3,17-diones can be manufactured by two alternate routes. The first route utilizes as the starting material, 3β,18-diacetoxypregn-5-en-20-one. (Prepared by the acetylation of 18,20-epoxy-3,20-dihydroxy-5-pregnene according to the procedure described in working Example 19 of my copending application, Serial No. 831,074, filed August 3, 1959.) Reaction of the latter substance with hydroxylamine hydrochloride in pyridine results in the formation of the 20-one oxime, which is treated with phosphorus oxychloride in pyridine to yield 17β-acetamidoandrost-5-ene-3β,18-diol diacetate. Hydrolysis of this diacetate, suitably with aqueous potassium carbonate in methanol, affords 17β-acetamidoandrost-5-ene-3β,18-diol. Cleavage of the amide group, typically by heating with potassium hydroxide in ethylene glycol, results in 17β-aminoandrost-5-ene-3β,18-diol, which upon acylation with acetic anhydride in acetic acid containing p-toluenesulfonic acid yields the p-toluenesulfonic acid salt of 17β-aminoandrost-5-ene-3β,18-diol diacetate. The corresponding free base results from treatment of an aqueous solution of that salt with one molecular equivalent of sodium carbonate and extraction of the neutralized mixture with ether. A solution of the latter p-toluenesulfonic acid salt in aqueous acetic acid is treated with sodium nitrite to afford androst-5-ene-3β,17β,18-triol. Oppenauer oxidation of this triol, typically with aluminum isopropoxide and cyclohexanone in toluene, affords a mixture which is separated chromatographically into the desired 13α-18-norandrost-4-ene-3,17-dione and 18-norandrost-4-ene-3,17-dione.

The novel intermediates of the previous paragraph, as represented by the structural formula

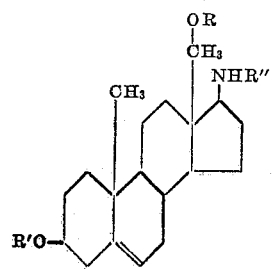

wherein R, R', and R" are selected from the group comprising hydrogen and acetyl radicals, are useful also due to their valuable pharmacological properties. For example, they are anti-inflammatory agents.

The second route to the instant 18-norandrost-4-ene-3,17-diones involves the use of 18,20-epoxypregn-4-en-3-one 20-hydroperoxide (prepared by the oxidation of 18,20-epoxy-20-hydroxypregn-4-en-3-one by the method disclosed in Example 1 of my co-pending application, Serial No. 862,044, filed December 28, 1959) as the starting material. Reaction of the latter substance in benzene-ether with excess trifluoroacetic anhydride in the presence of triethylamine affords 3-oxoandrost-4-ene-17β,18-diyl trifluoroacetylketene acetal, as illustrated by the structural formula

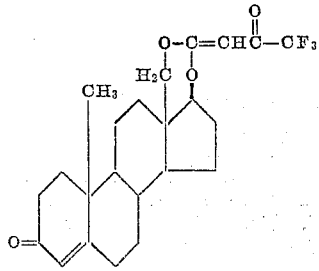

Hydrolysis of this ketal, suitably in acetone with dilute aqueous perchloric acid, produces 3-oxandrost-4-ene-17β,18-diol 18-trifluoroacetoacetate. A solution of the latter ester and sodium hydroxide in aqueous methanol is allowed to react, resulting in 17β,18-dihydroxyandrost-4-ene-3-one. This diol is oxidized, suitably in acetone with aqueous chromic acid, to afford 18-oxoandrost-4-ene-3,17-dione. Treatment of this 18-oxo compound with aqueous sodium hydroxide in methanol at the reflux temperature results in the aforementioned 13α-18-norandrost-4-ene-3,17-dione and 18-norandrost-4-ene-3,17-dione.

The latter intermediates characterized by the structural formula

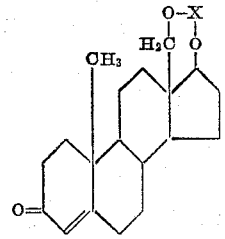

wherein X is a trifluoroacetylvinyl:

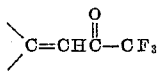

or a trifluoroacetylmethyl-hydroxymethylene:

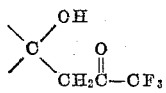

group, exhibit also valuable pharmacological properties, as exemplified by their ability to inhibit the sodium-retaining activity of desoxycorticosterone acetate.

The invention will appear more fully from the examples which follow. These examples are set forth by way of illustration only and it will be understood that the invention is not to be construed as limited in spirit or in scope by the details contained therein, as many modifications in materials and methods will be apparent from this disclosure to those skilled in the art. In these examples temperatures are given in degrees centigrade (° C.). Quantities of materials are expressed in parts by weight unless otherwise noted.

*Example 1*

To a solution of 2.1 parts of 3β,18-diacetoxy-pregn-5-en-20-one in 30 parts of pyridine is added 2.1 parts of hydroxylamine hydrochloride, and the mixture is stirred until homogeneous, then heated at 60–70° for about 2 hours. After standing at room temperature for about 15 hours, this solution is treated with ice to the point of turbidity, after which crystallization occurs within a few minutes. These crystals are collected by filtration, washed with aqueous pyridine, and dried to afford 3β,18-diacetoxypregn-5-en-20-one oxime, M.P. about 184–186°.

*Example 2*

To 15 parts of pyridine, cooled in a Dry Ice bath, is added 5 parts of phosphorus oxychloride. The resulting slurry is stirred, and 2.9 parts of 3β,18-diacetoxy pregn-5-en-20-one oxime is added without additional cooling. This mixture is stirred for about 2 hours longer at room temperature, and the clear orange solution is poured slowly over crushed ice. Extraction of this mixture with benzene affords an organic solution which is washed with water, dried over anhyrrous sodium sulfate, and evaporated to dryness in an atmosphere of nitrogen. The resulting residue is crystallized from ether to produce 17β-acetamidoandrost-5-ene-3β,18-diol diacetate, M.P. about 154.5–155.5°. It can be represented by the structural formula

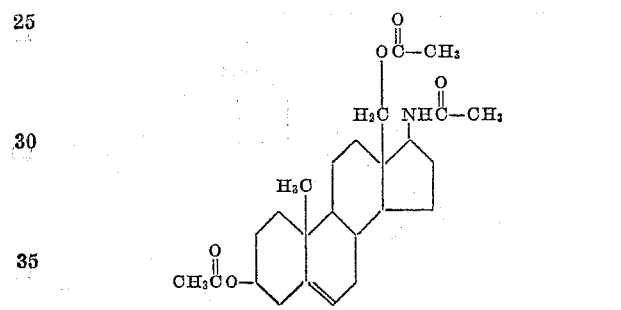

*Example 3*

To a solution of 5.67 parts of 17β-acetamido-androst-5-ene-3β,18-diol diacetate in 120 parts of methanol is added a solution of 8 parts of potassium carbonate in 60 parts of water, and the resulting mixture is heated at reflux for about 2 hours, then allowed to stand at room temperature for about 15 hours. The crystals which form are collected by filtration, washed with aqueous methanol, and dried to afford 17β-acetamidoandrost-5-ene-3β,18-diol, M.P. about 238–240°.

*Example 4*

A solution of one part of 17β-acetamidoandrost-5-ene-3β,18-diol in 110 parts of ethylene glycol is treated with 3 parts of potassium hydroxide, and this reaction mixture is heated at reflux, under nitrogen, for about 4 hours, then concentrated to a small volume in vacuo. The residue ish diluted with water, then extracted with chloroform. The organic extract is washed with water, dried over anhydrous sodium sulfate, and evaporated to dryness to afford the solid product, 17β-aminoandrost-5-ene-3β,18-diol.

*Example 5*

To a solution of 1.9 parts of p-toluenesulfonic acid and 10 parts of acetic anhydride in 50 parts of acetic acid is added 3 parts of 17β-aminoandrost-5-ene-3β,18-diol, and the resulting mixture is stirred at room temperature for about 15 hours, then concentrated to dryness at reduced pressure to afford the p-toluene sulfonic acid salt of 17β-aminoandrost-5-ene-3β, 18-diol diacetate.

The free base is obtained by carefully treating an aqueous solution of the latter salt with one molecular equivalent of sodium carbonate, and extracting the resulting mixture with ether. Evaporation of the solvent affords 17β-aminoandrost-5-ene-3β,18-diol diacetate.

Example 6

To a solution of one part of the p-toluenesulfonic acid salt of 17β-aminoandrost-5-ene-3β,18-diol diacetate in 50 parts of 50% aqueous acetic acid is added, at 0–5°, 10 parts of sodium nitrite, and the resulting mixture is stirred at room temperature for about 15 hours, then concentrated to dryness in vacuo. The residue is dissolved in 100 parts of methanol, and this solution is adjusted to pH 10 by the addition of aqueous sodium hydroxide, then heated at reflux for about 2 hours, cooled, and concentrated in a nitrogen atmosphere. Chloroform and water are added to the residue and the organic layer is separated, washed successively with dilute hydrochloric acid and water, dried over anhydrous sodium sulfate, and concentrated at reduced pressure to afford androst-5-ene-3β,17β,18-triol, M.P. about 199–201°.

Example 7

To a solution of 36 parts of cyclohexanone in 130 parts of toluene is added one part of androst-5-ene-3β,17β,18-triol, and the resulting mixture is distilled under nitrogen until 30 parts by volume of solvent is collected. To this mixture is added 3.3 parts of aluminum isopropoxide, about 18 parts by volume of distillate is collected; then an additional 1.5 parts of aluminum isopropoxide is added, and about 36 parts by volume of distillate collected. The reaction mixture is cooled by means of an ice bath, then stirred and treated with a solution of 2.2 parts of concentrated hydrochloric acid in 13 parts of ice-cold water. After stirring for about 10 minutes longer, benzene is added and the organic layer is separated, washed with water, dried over anhydrous sodium sulfate, and evaporated to dryness at reduced pressure. A solution of the residue in benzene is chromatographed on 10 parts of silica gel and the column is eluted with increasing concentrations of ether in benzene. Concentration of the 10% ether in benzene eluate followed by recrystallization of the resulting solid from benzene affords pure crystalline 13α-18-norandrost-4-ene-3,17-dione, M.P. about 198–203°.

The 20% ether in benzene eluate is concentrated to dryness, and the resulting product is purified by fractional crystallization, first from benzene-ether and then from methanol, to afford 18-norandrost-4-ene-3,17-dione, M.P. about 151.5–153.5°.

Example 8

To 14.3 parts by volume of a solution, prepared by mixing 103 parts of dioxane, 20.66 parts of ethyl orthoformate, 6.4 parts of anhydrous ethanol, and 2 parts of p-toluenesulfonic acid, is added 2.17 parts of 13α-18-norandrost-4-ene-3,17-dione, and the resulting mixture is stirred for about 1½ hours. Benzene is added and the organic layer is separated, washed successively with dilute aqueous sodium hydroxide and water, dried over anhydrous sodium sulfate, and concentrated in vacuo to a gummy residue which, upon crystallization from methylcyclohexane, affords elongated prisms of 3-ethoxy-13α-18-norandrosta-3,5-dien-17-one, M.P. about 110–117°.

Example 9

To 280 parts of an isopropyl alcohol solution containing 3.5 parts of sodium borohydride and 3.5 parts of sodium hydroxide is added, at 0–5°, 1.3 parts of 3-ethoxy-13α-18-norandrosta-3,5-dien-17-one, and the resulting solution is stored at that temperature for about 16 hours. Concentration of the reaction mixture in vacuo affords a residue, which is diluted with water and neutralized with dilute hydrochloric acid. The resulting solid is collected by filtration and dried to afford 3-ethoxy-18-norandrosta-3,5-dien-17β-ol.

Example 10

To a suspension of 5 parts of chromium trioxide in 25 parts of pyridine is added a solution of 5 parts of 3-ethoxy-18-norandrosta-3,5-dien-17β-ol in 50 parts of pyridine, and this mixture is stored at room temperature for about 3 hours, then extracted with ether. The organic extract is washed with water, dried over anhydrous sodium sulfate, and concentrated to dryness in vacuo. Recrystallization of the residue from methanol produces 3-ethoxy-18-norandrosta-3,5-dien-17-one, M.P. about 153–162°.

Example 11

To a solution of 200 parts by volume of 3 molar ethereal methyl magnesium bromide in 2450 parts of ether is added a solution of 8.5 parts of 3-ethoxy-18-norandrosta-3,5-dien-17-one in 350 parts of ether, and the resulting mixture is stirred at room temperature for about 3 hours. Excess saturated aqueous sodium potassium tartrate is added, and the organic layer is separated, washed with water, dried over anhydrous sodium sulfate, and evaporated to dryness in vacuo to afford 3-ethoxy-17α-methyl-18-norandrosta-3,5-dien - 17β - ol, which exhibits maxima in the infrared at about 2.85, 6.00, and 6.15 microns.

By substituting an equivalent quantity of ethereal ethyl magnesium bromide in the process of this example, 3-ethoxy-17α-ethyl-18-norandrosta-3,5-dien - 17β - ol is obtained.

Example 12

A solution of one part of 3-ethoxy-17α-methyl-18-norandrosta-3,5-dien-17β-ol in 20 parts of acetone is treated with 3 parts of 1 N hydrochloric acid, and this mixture is allowed to stand at room temperature for about 2 hours, then extracted with benzene. The organic layer is washed successively with aqueous sodium hydroxide and water, dried over anhydrous sodium sulfate, and evaporated to dryness, under nitrogen. Recrystallization of the residue from benzene affords pure 17β-hydroxy-17α-methyl-18-norandrost-4-en - 3 - one, M.P. about 193–198.5°.

The substitution of an equivalent quantity of 3-ethoxy-17α-ethyl-18-norandrosta-3,5-dien - 17β - ol in the hereindescribed process results in 17α-ethyl-17β-hydroxy-18-norandrost-4-en-3-one.

Example 13

To a solution of 0.88 part of triethylamine in 30 parts of benzene and 4 parts of ether is added successively, at 0–5° with stirring, 1.5 parts of trifluoroacetic anhydride and 1.002 parts of 18,20-epoxy-pregn-4-en-3-one 20-hydroperoxide. The reaction mixture is stirred at that temperature for about one hour longer, then treated successively with 1.02 parts of triethylamine and 20 parts of dilute aqueous sodium hydroxide, and stirred for about 10 minutes with further cooling. Benzene is added and the organic layer is separated by decantation, washed successively with dilute aqueous sodium hydroxide and water, dried over anhydrous sodium sulfate, and concentrated to dryness in vacuo. Crystallization of the gummy residue from ether-benzene affords 3-oxoandrost-4-ene-17β,18-diyl trifluoroacetylketene acetal, M.P. about 177–179°. It exhibits characteristic infrared maxima at about 6.00 and 6.40 microns and also unltraviolet maxima at about 239.5 and 287.5 millimicrons with molecular extinction coefficients of 16,000 and 25,900, respectively.

Example 14

A solution of 5 parts of 3-oxoandrost-4-ene-17β,18-diyl trifluoroacetylketene acetal in 240 parts of acetone is treated with 100 parts of 1% aqueous perchloric acid, and the mixture is allowed to stand at room temperature for about 10 minutes. Dilution with water followed by extraction with benzene affords an organic solution which is washed successively with aqueous potassium bicarbonate and water, dried over anhydrous sodium sulfate and evaporated to dryness in vacuo, resulting in 3-oxoandrost- 4-ene-17β,18-diol 18-trifluoroacetoacetate. This ester is in equilibrium with its tautomers as shown below:

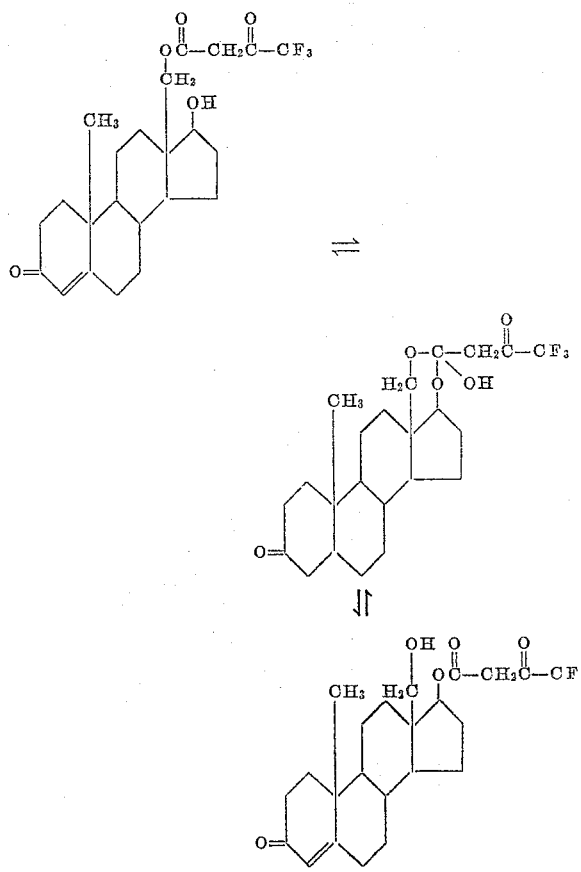

Example 15

A solution of 10 parts of 3-oxoandrost-4-ene-17β,18-diol 18-trifluoroacetoacetate in 200 parts of 90% aqueous methanol is adjusted to pH 10 by the addition of dilute aqueous sodium hydroxide, and the mixture is allowed to stand at room temperature for 15 hours, then concentrated to a small volume in vacuo. This residual mixture is extracted with benzene, and the organic solution is washed successively with dilute aqueous sodium hydroxide and water, dried over anhydrous sodium sulfate, and evaporated to dryness at reduced pressure. Trituration of the crystalline residue with ether followed by recrystallization from benzene affords pure 17β,18-dihydroxyandrost-4-en-3-one, M.P. about 166–167.5°.

Example 16

A solution of 2.664 parts of 17β,18-dihydroxyandrost-4-en-3-one in 160 parts of acetone is cooled to 0–5°, then treated with 4.8 parts by volume of an aqueous solution, 8 N in chromium trioxide and 8 N in sulfuric acid. The mixture is stirred for about 10 minutes longer without further cooling, then treated successively with a few drops of isopropyl alcohol and 10 parts of water. Concentration in vacuo to approximately one-half volume produces a mixture containing precipitated chromium salts. The supernatant liquid is separated by decantation and extracted with benzene to afford an organic solution, which is then washed successively with water, dilute aqueous sodium hydroxide and water, dried over anhydrous sodium sulfate, and evaporated to dryness in vacuo. Crystallization of the residue from ether-benzene affords 18-oxoandrost-4-ene-3,17-dione, M.P. about 125–135°. It displays a characteristic maximum in the infrared at about 3.70 microns.

Example 17

To a solution of 1.5 parts of 18-oxoandrost-4-ene-3,17-dione in 80 parts of methanol is added 20 parts of 10% aqueous sodium hydroxide, and the mixture is heated at reflux, under nitrogen, for about 2 hours, then concentrated to about one-half volume. The residual mixture is extracted with benzene, and the resulting benzene solution is washed successively with dilute aqueous sodium hydroxide and water, dried over anhydrous sodium sulfate, and concentrated to dryness, under nitrogen. Recrystallization of the residue, first from ethanol then from benzene, affords 13α,18-norandrost-4-ene-3,17-dione, M.P. about 198–203°; [α]$_D$=−13° (chloroform). This substance is identical with the first product of Example 7.

The latter ethanol and benzene mother liquors are combined and evaporated to dryness, and the residue is chromatographed on silica gel. The chromatographic column is eluted with increasing concentrations of ether and benzene. The 20% ether in benzene eluate is concentrated to dryness and the resulting residue recrystallized, first from ether-benzene then from methanol, to produce pure 18-norandrost-4-ene-3,17-dione, M.P. 152–154°; [α]$_D$=+240° (chloroform). This compound is identical with the second product of Example 7.

What is claimed is:

1. A compound of the structural formula

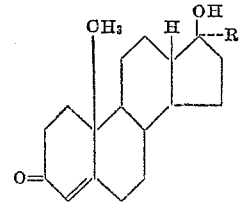

wherein R is a lower alkyl radical.

2. 17β-hydroxy-17α-methyl-18-norandrost-4-en-3-one.
3. 17α-ethyl-17β-hydroxy-18-norandrost-4-en-3-one.
4. A compound of the structural formula

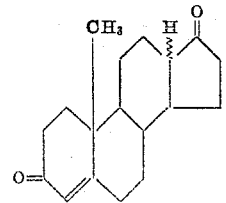

5. 13α-18-norandrost-4-ene-3,17-dione.
6. 18-norandrost-4-ene-3,17-dione.
7. 17β-acetamidoandrost-5-ene-3β,18-diol diacetate.
8. 17β-acetamidoandrost-5-ene-3β,18-diol.
9. 17β-aminoandrost-5-ene-3β,18-diol.
10. 17β-aminoandrost-5-ene-3β,18-diol diacetate.
11. 3β,18-diacetoxypregn-5-en-20-one oxime.
12. A compound of the structural formula

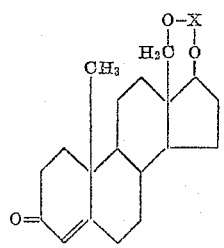

wherein X is a member of the class consisting of

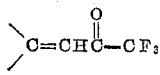

and

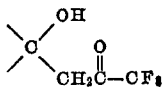

groups.

13. 3-oxoandrost-4-ene-17β,18-diol 18-trifluoroacetoacetate.

14. 3-oxoandrost-4-ene-17β,18-diyl trifluoroacetylketene acetal.

15. A compound of the structral formula

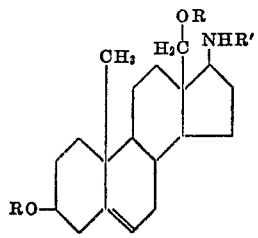

wherein the substituents represented by R are invariably identical and are selected from the group consisting of hydrogen and acetyl radicals, and R' is selected from the group consisting of hydrogen and acetyl radicals.

References Cited in the file of this patent
FOREIGN PATENTS 752,032    Great Britain ---------- July 4, 1956

OTHER REFERENCES

Fieser et al.: Natural Products Related to Phenanthrene, third edition (1949), Reinhold Publishing Corp., New York, 703 pages (page 368 relied on).

Dorfman et al.: Androgens, John Wiley and Sons, Inc., New York, (1956), 590 pages (pages 335–338 and 368–384 of interest).